(12) United States Patent
Christoffersson et al.

(10) Patent No.: US 8,165,099 B2
(45) Date of Patent: Apr. 24, 2012

(54) CONTINUOUS PACKET CONNECTIVITY (CPC) SCHEDULER

(75) Inventors: Jan Christoffersson, Luleå (SE); Mårten Ericson, Luleå (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 619 days.

(21) Appl. No.: 12/337,861

(22) Filed: Dec. 18, 2008

(65) Prior Publication Data

US 2010/0157953 A1 Jun. 24, 2010

(51) Int. Cl.
*H04J 3/00* (2006.01)
*H04J 3/06* (2006.01)
*H04L 12/43* (2006.01)
*H04W 4/00* (2009.01)

(52) U.S. Cl. ........ 370/336; 370/350; 370/459; 370/508; 370/328; 455/522

(58) Field of Classification Search ................... 370/350, 370/503, 329–330, 328, 336, 342–343, 335, 370/508–510, 458–459, 447, 449, 462, 236; 455/522
See application file for complete search history.

(56) References Cited

U.S. PATENT DOCUMENTS

| | | | |
|---|---|---|---|
| 6,819,661 B2 * | 11/2004 | Okajima et al. ............... | 370/347 |
| 7,508,796 B2 * | 3/2009 | Tanabe ......................... | 370/335 |
| 2003/0031144 A1 * | 2/2003 | Joshi et al. .................... | 370/335 |
| 2004/0228308 A1 * | 11/2004 | Joshi et al. .................... | 370/335 |
| 2007/0025264 A1 * | 2/2007 | Cheng et al. .................. | 370/252 |
| 2008/0049710 A1 * | 2/2008 | Zeira et al. .................... | 370/345 |
| 2008/0194282 A1 * | 8/2008 | Nibe et al. ..................... | 455/522 |
| 2008/0247339 A1 * | 10/2008 | Choi et al. .................... | 370/281 |
| 2009/0061886 A1 * | 3/2009 | Cozzo et al. .................. | 455/450 |
| 2009/0086682 A1 * | 4/2009 | Kazmi et al. .................. | 370/335 |
| 2010/0111023 A1 * | 5/2010 | Pelletier et al. ............... | 370/329 |

FOREIGN PATENT DOCUMENTS

| | | |
|---|---|---|
| WO | WO 00/74291 A1 | 12/2000 |
| WO | WO 2008/024357 A2 | 2/2008 |
| WO | WO 2008/024889 A2 | 2/2008 |

OTHER PUBLICATIONS

3GPP TS 25.214 V7.4.0 (Mar. 2007) Technical Specification Group Radio Access Network. Physical layer procedures (FDD), 2007, 76 pages.
PCT International Search Report and Written Opinion corresponding to PCT/SE2009/051241, mailed Apr. 14, 2010, 10 pages.
Tao Chen et al., "Uplink DPCCH Gating of Inactive UEs in Continuous Packet Connectivity Mode for HSUPA", Nokia Technology Platforms, Nokia Research Center, University of Jyvaskyla, IEEE Computer Society, 2007, pp. 1686-1691.

* cited by examiner

*Primary Examiner* — Kwang B Yao
*Assistant Examiner* — Candal Elpenord
(74) *Attorney, Agent, or Firm* — Myers Bigel Sibley & Sajovec

(57) ABSTRACT

A base station establishes a data channel in an uplink between the base station and a user equipment, establishes a control channel in the uplink between the base station and the user equipment, and determines a gating configuration associated with the control channel. The base station also transmits the gating configuration to the user equipment, receives a gated control signal, via the control channel, based on the gating configuration, and synchronizes time slots for signal bursts associated with the gated control signal and time slots for data packets associated with the data channel. The base station further schedules transmissions of the data packets based on the synchronized time slots, generates an absolute grant based on the scheduled transmissions of the data packets, and transmits the absolute grant to the user equipment.

14 Claims, 14 Drawing Sheets

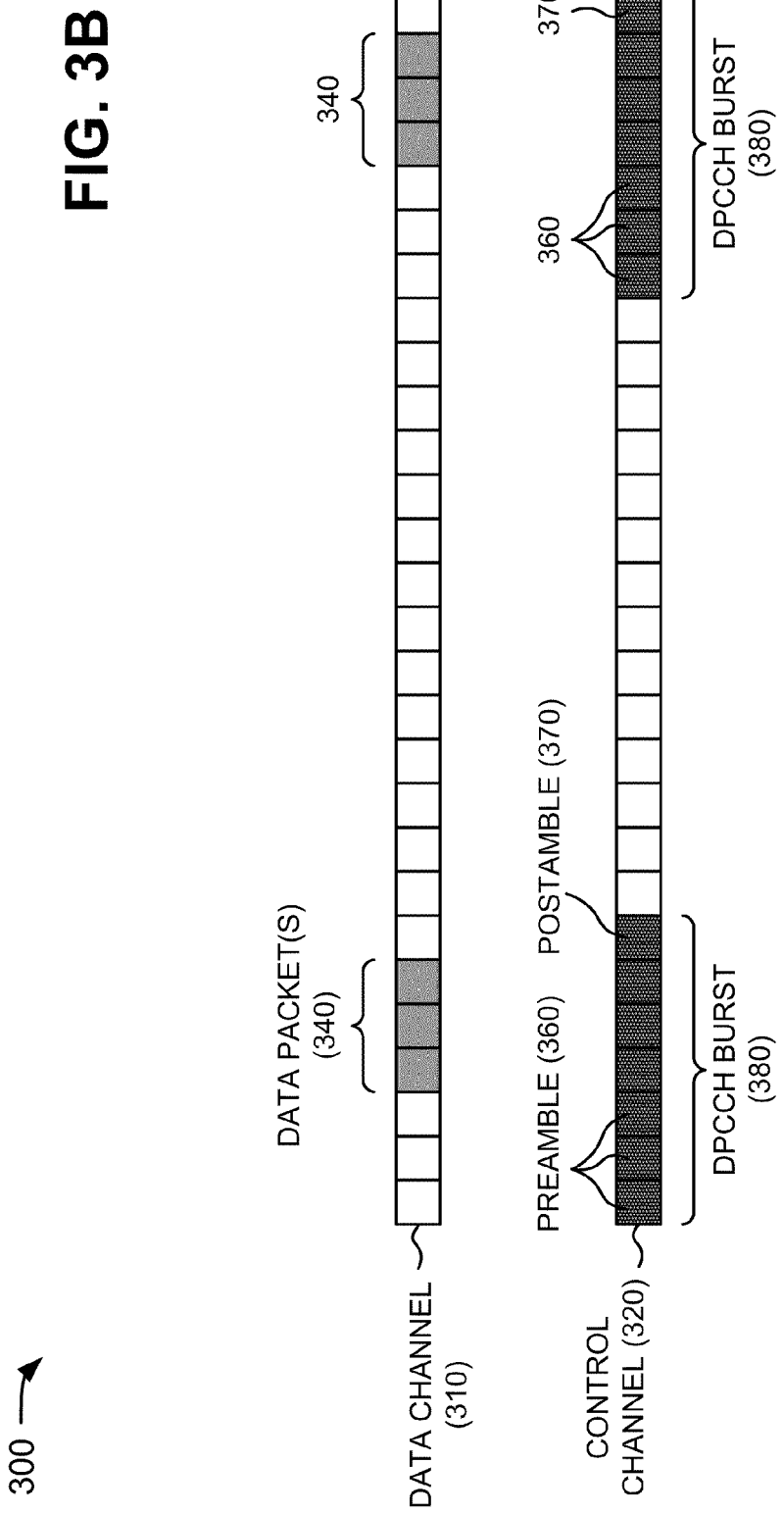

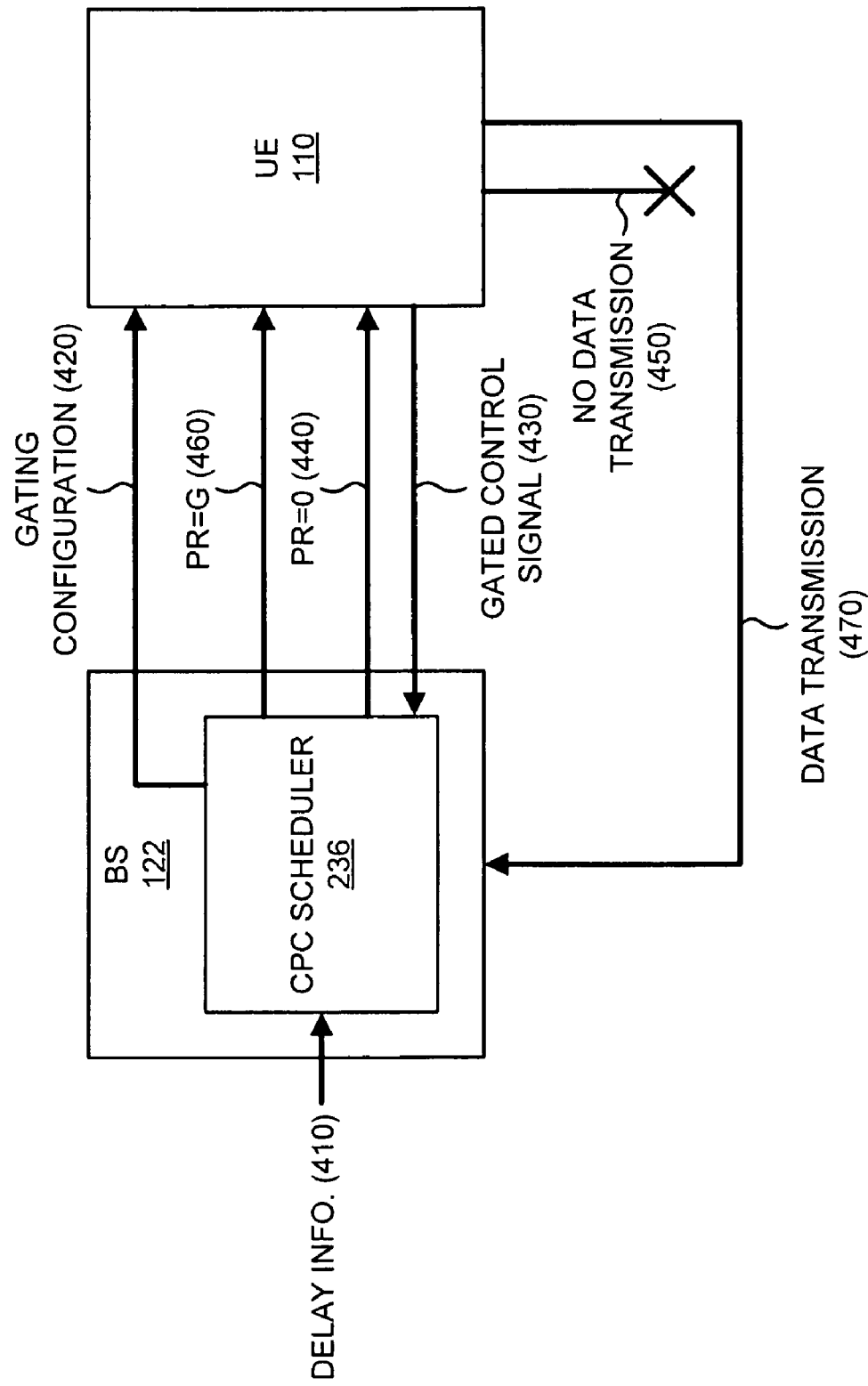

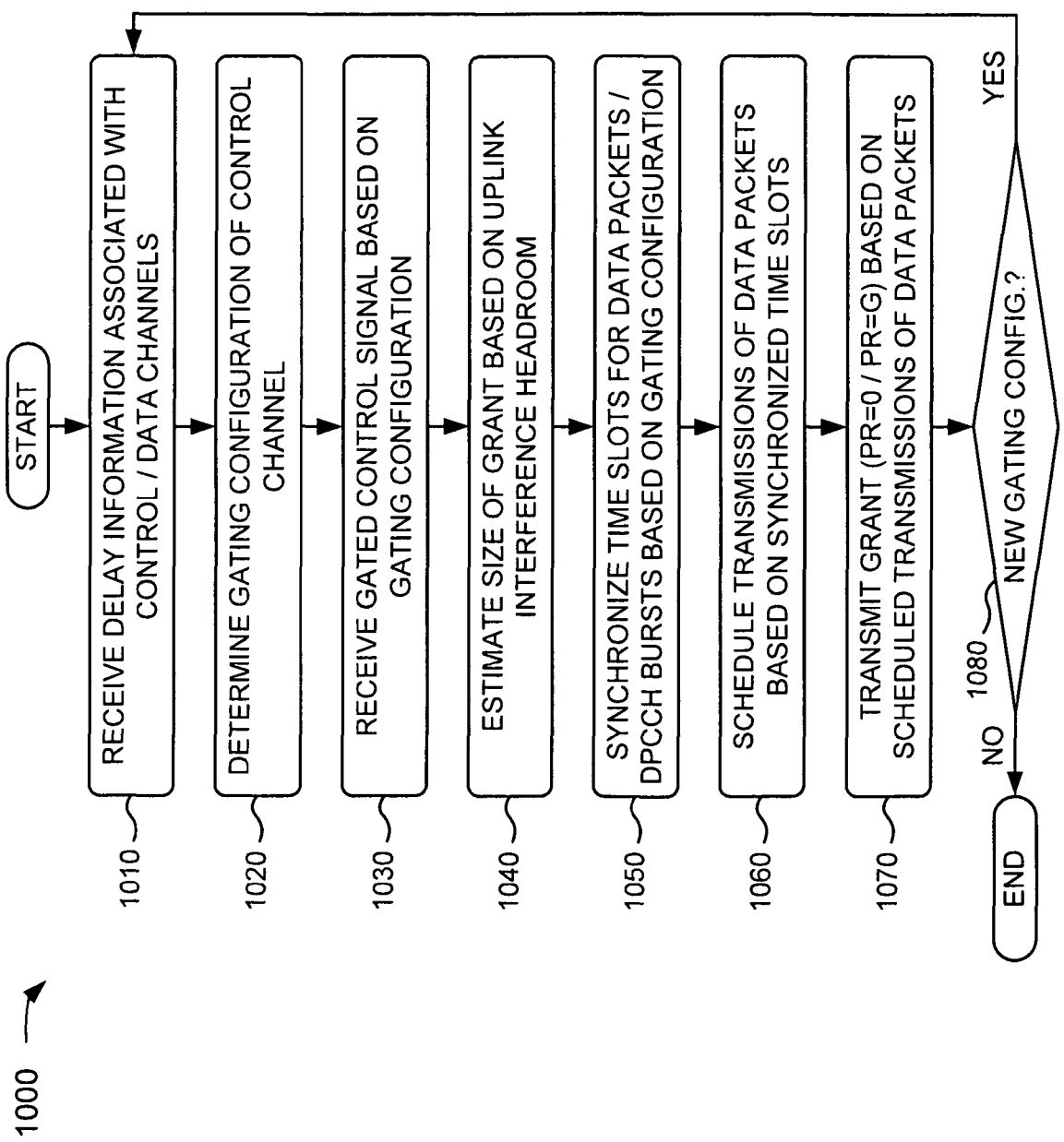

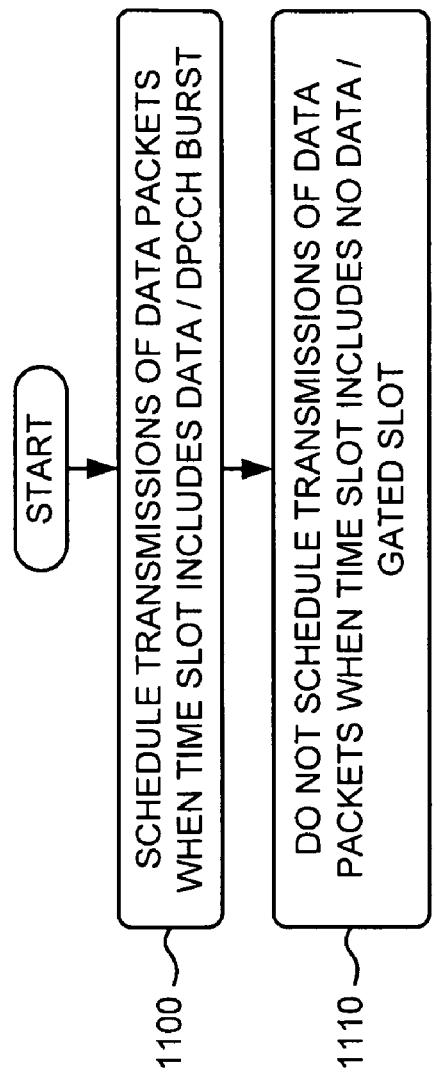

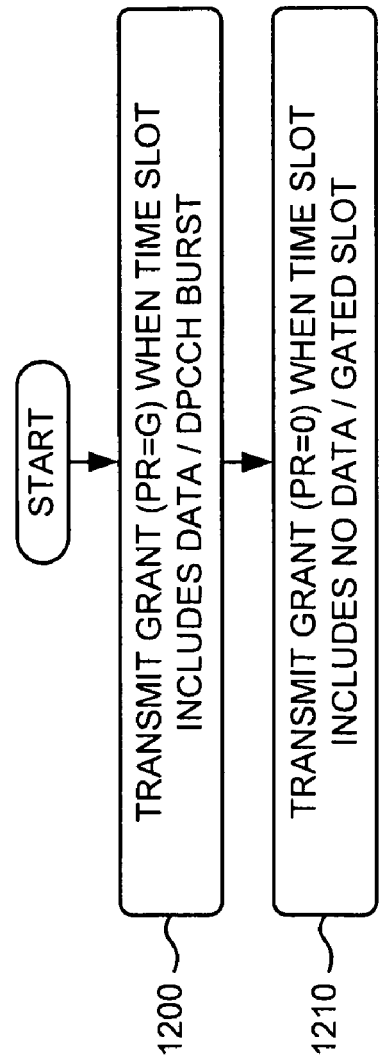

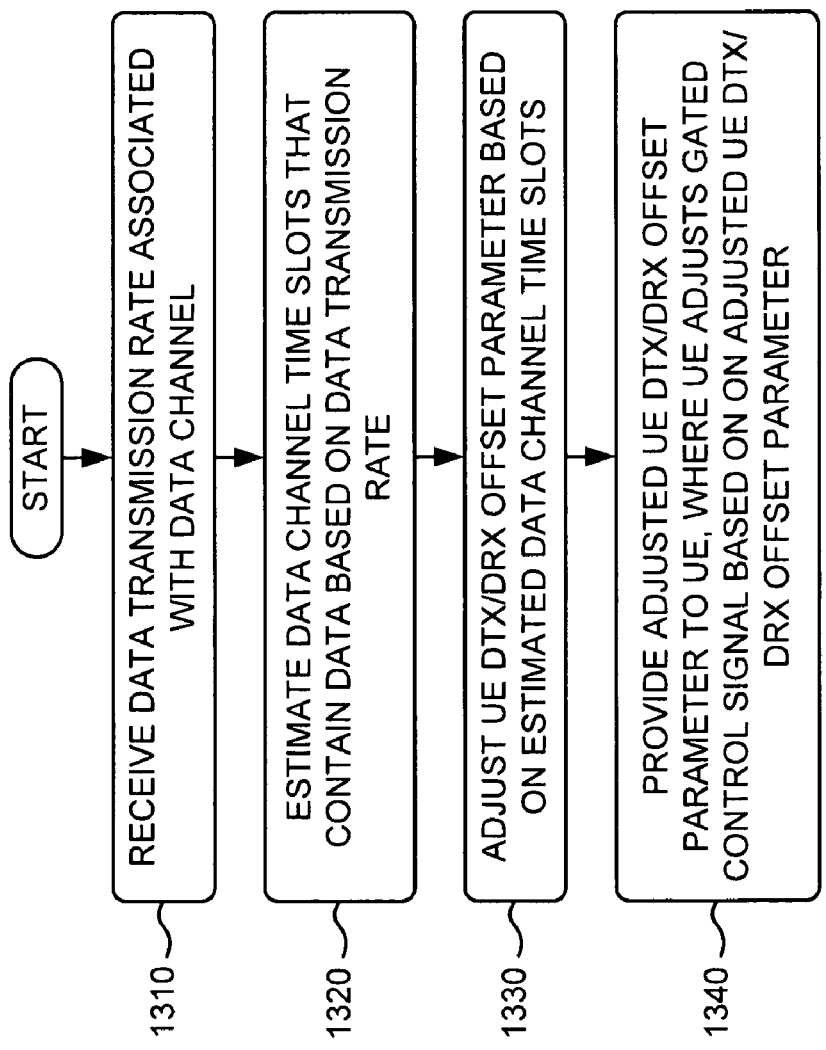

CONTINUOUS PACKET CONNECTIVITY (CPC) SCHEDULER

TECHNICAL FIELD

Embodiments described herein relate generally to communication systems, and, more particularly, to continuous packet connectivity (CPC) scheduling in a telecommunication system.

BACKGROUND

Continuous packet connectivity (CPC) was introduced in Release 7 of the Third Generation Partnership Project (3GPP) standards. CPC reduces uplink interference created by dedicated physical control channels of packet data users when those channels have no user data to transmit. This, in turn, increases a supported number of simultaneously connected high-speed uplink packet access (HSUPA) users. CPC permits discontinuous uplink transmission and discontinuous downlink reception, where the user equipment can turn off its receiver after a certain period of high-speed downlink packet access (HSDPA) inactivity. CPC may be especially beneficial to voice over Internet protocol (VoIP) data packets provided on the uplink because the user equipment can turn off between VoIP data packets.

CPC attempts to reduce overhead in the uplink, increase the number of HSUPA/HSDPA users that can be kept in a cell dedicated channel (CELL_DCH) state, and reduce latency for restart after temporary inactivity. The overhead in the uplink results mainly from continuous transmission (e.g., by the user equipment) of a dedicated physical control channel (DPCCH) signal when data is not being transmitted. The DPCCH consists of both pilot bits and power control bits. The pilot bits are used for channel estimation and decoding of actual data. The DPCCH power control bits are used for adjusting the downlink power control. Thus, the DPCCH serves the purpose of maintaining synchronization and keeping power control ready when needed for rapid resumption of data transmission.

CPC utilizes a number of methods that attempt to make systems (e.g., a wideband code division multiple access (WCDMA) system, a high-speed packet access (HSPA) system, etc.) provide higher capacity and quality. One such method is referred to as user equipment (UE) discontinuous transmission and reception (DTX/DRX) (or "uplink DPCCH gating"). With UE DTX/DRX, the user equipment periodically sends (or "gates") the power control (e.g., DPCCH) signaling (called "UE DTX bursts" in the 3GPP specifications) or sends the power control signaling when data is sent on an enhanced dedicated channel (E-DCH) dedicated physical data channel (E-DPDCH) or a high speed DPCCH (HS-DPCCH). UE DTX/DRX may use a UE DTX/DRX offset parameter to tailor the power control (e.g., DPCCH) signaling. Another method utilized by CPC is referred to as Node B (or downlink (DL)) discontinuous reception (DRX). In Node B DRX, data transmission (e.g., an E-DPDCH data transmission) may be held or delayed until the start of the next power control signaling burst (e.g., a DPCCH burst).

Both methods (e.g., UE DTX/DRX and Node B DRX) attempt to align the timing of data transmission (e.g., E-DPDCH transmission) with the timing of power control (e.g., DPCCH) signaling (the so called UE DTX burst). For example, both methods may attempt to align time slots (e.g., transmission time intervals (TTIs)) associated with the data transmission and the power control signaling. In UE DTX/DRX, a DPCCH preamble (e.g., of two time slots) and DPCCH postamble (e.g., of one time slot) must be sent before and after all data transmissions. In Node B DRX, the start of a data transmission coincides with the start of a DPCCH burst so that there is no DPCCH preamble, other than what is prescribed in the standard, before the data transmission and a longer DPCCH postamble after the data transmission.

Considerable gains can be achieved if the data transmissions (e.g., VoIP transmissions) are associated with DPCCH preambles exceeding the standard two time slot preamble. The optimal DPCCH preamble length may depend on channel conditions, the user equipment speed, and radio-specific configurations (e.g., open-loop power control (OLPC), retransmission/block error rate (BLER) targets, power offsets, etc.). However, according to the standard, it is not possible to obtain a preamble longer than the two time slot preamble. The two time slot preamble may be too short for certain data transmissions (e.g., for VoIP transmissions) in many cases. In such cases, the power control signal is unable to keep up with the quickly-changing radio conditions. For example, with a two millisecond (ms) TTI, there is a risk that a carrier to interference ratio (CIR) target is not met using the two time slot preamble. This means that there is a risk that a data packet may need to be retransmitted or may be lost. There is also a risk that the CIR target is raised, which results in reduced capacity.

SUMMARY

It is an object of the invention to overcome at least some of the above disadvantages and to provide CPC scheduling that controls relative positions of control signal (e.g., DPCCH) bursts and data (e.g., VoIP) transmissions.

Embodiments described herein may provide systems and/or methods that control relative positions of UE DTX burst (e.g., which includes a DPCCH control signal burst of a predefined length) and data (e.g., VoIP) transmissions so that the data transmissions are associated with DPCCH preambles that exceed the standard two time slot preamble. For example, in one embodiment, the systems and/or methods may schedule the data transmissions with respect to the control channel (e.g., DPCCH) discontinuous transmission (DTX) pattern by sending, to the user equipment, an absolute grant (e.g., an absolute value of a power offset permitted for power usage by the user equipment) of zero when no data transmissions are to occur, and by sending an absolute grant of a value greater than zero when data transmissions are to occur. The scheduling of the data transmissions (e.g., based on the absolute grant value) may be optimized with respect to the control channel DTX pattern.

In one exemplary implementation of this embodiment, the systems and/or methods may receive delay information associated with a control channel and a data channel, may determine a gating configuration associated with the control channel, and may transmit a gated control signal, via the control channel, based on the gating configuration. The systems and/or methods may estimate a size of an absolute grant based on uplink interference headroom, may synchronize time slots for data packets and DPCCH bursts based on the gating configuration, and may schedule transmission of the data packets based on the synchronized time slots. The systems and/or methods may transmit an absolute grant (e.g., a power ratio (PR) of zero or a value (e.g., "G") greater than zero) to the user equipment based on the scheduled transmissions of the data packets, and may determine if a new gating configuration of the control channel needs to be determined.

In another embodiment, the systems and/or methods may schedule the control signal (e.g., DPCCH) DTX pattern with respect to the data transmissions. For example, since the data transmissions may be transmitted at a particular transmission rate (e.g., VoIP data may be transmitted every zero to twenty milliseconds) the systems and/or methods may estimate which TTIs will contain data packets, and may adjust the UE DTX/DRX offset parameter so that the ending time slots associated with the UE DTX signal (e.g., DPCCH) bursts may match the ends of the estimated TTIs, which contains the data packets.

In one exemplary implementation of this embodiment, the systems and/or methods may receive a data transmission rate associated with a data channel, and may estimate data channel time slots, that contain data, based on the data transmission rate. The systems and/or methods may adjust a UE DTX/DRX offset parameter based on the estimated data channel time slots, and may provide the adjusted UE DTX/DRX offset parameter to a user equipment, where the user equipment may adjust a gated control signal based on the adjusted UE DTX/DRX offset parameter.

Systems and/or methods described herein may provide a CPC scheduler that can handle bundled data, such as bundled VoIP, by reconfiguring the gating configuration to ensure that sizes of the absolute grants are large enough to transmit enough data (e.g., two to three VoIP packets) in one TTI. For example, if the CPC scheduler reconfigures the gating configuration to one DPCCH burst per forty to sixty milliseconds, the VoIP packets can be bundled automatically. The systems and/or methods may also provide DPCCH preambles that exceed the standard two time slot preamble, which is required for periodic data transmissions (e.g., such as VoIP transmissions, Internet surfing, etc.), without requiring a change in the 3GPP standard. The systems and/or methods may enhance the performance of uplink DPCCH gating by reducing DPCCH transmissions in cases where DPCCH transmissions are unnecessary. The reduced DPCCH transmissions may reduce uplink interference, which may provide higher uplink capacity and may reduce battery consumption in the user equipment.

BRIEF DESCRIPTION OF THE DRAWINGS

FIG. 3B illustrates a diagram of the exemplary data channel and control channel signals depicted in FIG. 3A, where control channel signal bursts and are aligned;

FIG. 4 depicts a diagram of exemplary interactions among components of an exemplary portion of the network illustrated in FIG. 1;

FIGS. 10-12 depict flow charts of an exemplary process for scheduling data channel signals with respect to control channel signals according to embodiments described herein; and FIG. 13 illustrates a flow chart of an exemplary process for scheduling control channel signals with respect to data channel signals according to embodiments described herein.

DETAILED DESCRIPTION

The following detailed description refers to the accompanying drawings. The same reference numbers in different drawings may identify the same or similar elements. Also, the following detailed description does not limit the invention.

Embodiments described herein may provide systems and/or methods that control relative positions of control signal (e.g., DPCCH) bursts and data (e.g., VoIP) transmissions so that the data transmissions are associated with DPCCH preambles that exceed the standard two time slot preamble.

Figure 1:
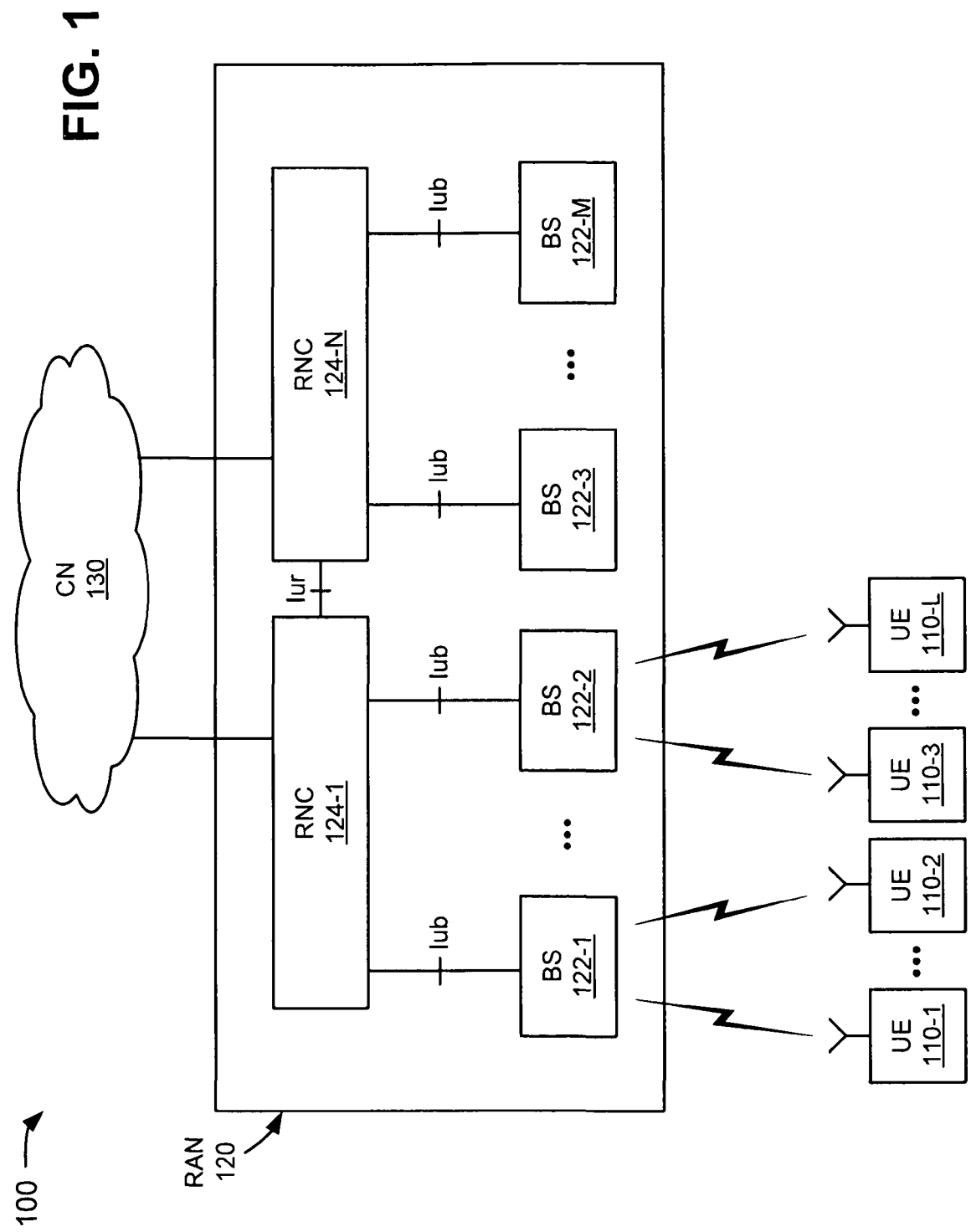
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UE) 110-1 through 110-L (referred to collectively, and in some instances individually, as "user equipment 110"), a radio access network (RAN) 120, and a core network (CN) 130. Four pieces of user equipment 110, a single radio access network 120, and a single core network 130 have been illustrated in FIG. 1 for simplicity. In practice, there may be more UEs 110, random access networks 120, and/or core networks 130. Also, in some instances, a component in network 100 (e.g., one or more of user equipment 110, radio access network 120, and core network 130) may perform one or more functions described as being performed by another component or group of components in network 100.

User equipment 110 may include one or more devices capable of sending/receiving voice and/or data to/from radio access network 120. User equipment 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc. In one embodiment, user equipment 110 may receive a gated control signal (e.g., a gated power control signal) via a dedicated physical control channel (DPCCH), and/or may transmit a data transmission (e.g., a VoIP transmission, other periodic data transmissions, etc.) via a dedicated physical data channel (e.g., an E-DPDCH).

Radio access network 120 may include one or more devices for transmitting voice and/or data to user equipment 110 and core network 130. As illustrated, radio access network 120 may include a group of base stations (BSs) 122-1 through 122-M (referred to collectively as "base stations 122" and in some instances, individually as "base station 122") and a group of radio network controllers (RNCs) 124-1 through 124-N (referred to collectively as "radio network controllers 124" and in some instances, individually as "radio network controller 124"). Four base stations 122 and two radio network controllers 124 are shown in FIG. 1 for simplicity. In practice, there may be more or fewer base stations 122 and/or radio network controllers 124. Also, in some instances, a component in radio access network 120 (e.g., one or more of base stations 122 and radio network controllers 124) may perform one or more functions described as being performed by another component or group of components in radio access network 120.

Base stations 122 (also referred to as "Node Bs") may include one or more devices that receive voice and/or data from radio network controllers 124 and transmit that voice and/or data to user equipment 110 via an air interface. Base stations 122 may also include one or more devices that receive voice and/or data from user equipment 110 over an air interface and transmit that voice and/or data to radio network controllers 124 or other user equipment 110.

In one embodiment, base station 122 may receive delay information associated with a control channel and a data channel, may determine a gating configuration associated with the control channel, and may transmit a gated control signal, via the control channel, based on the gating configuration. Base station 122 may estimate a size of an absolute grant based on uplink interference headroom, may synchronize time slots for data packets and DPCCH bursts based on the gating configuration, and may schedule transmission of the data packets based on the synchronized time slots. Base station 122 may transmit an absolute grant (e.g., a power ratio (PR) of zero or a value (e.g., "G") greater than zero) to user equipment 110 based on the scheduled transmissions of the data packets, and may determine if a new gating configuration of the control channel needs to be determined (e.g., based on changing channel conditions).

In another embodiment, base station 122 may receive a data transmission rate associated with a data channel, and may estimate data channel time slots, that contain data, based on the data transmission rate. Base station 122 may adjust a UE DTX/DRX offset parameter based on the estimated data channel time slots, and may provide the adjusted UE DTX/DRX offset parameter to user equipment 110. User equipment 110 may receive the adjusted UE DTX/DRX offset parameter, and may adjust a gated control signal based on the adjusted UE DTX/DRX offset parameter.

Radio network controllers 124 may include one or more devices that control and manage base stations 122. Radio network controllers 124 may also include devices that perform data processing to manage utilization of radio network services. Radio network controllers 124 may transmit/receive voice and data to/from base stations 122, other radio network controllers 124, and/or core network 130.

A radio network controller 124 may act as a controlling radio network controller (CRNC), a drift radio network controller (DRNC), or a serving radio network controller (SRNC). A CRNC may be responsible for controlling the resources of a base station 122. On the other hand, an SRNC may serve particular user equipment 110 and may manage connections towards that user equipment 110. Likewise, a DRNC may fulfill a similar role to the SRNC (e.g., may route traffic between a SRNC and particular user equipment 110).

As illustrated in FIG. 1, a radio network controller 124 may connect to a base station 122 via an Iub interface and to another radio network controller 124 via an Iur interface.

Core network 130 may include one or more devices that transfer/receive voice and/or data to a circuit-switched and/or packet-switched network. In one embodiment, core network 130 may include, for example, a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices.

Figure 2:
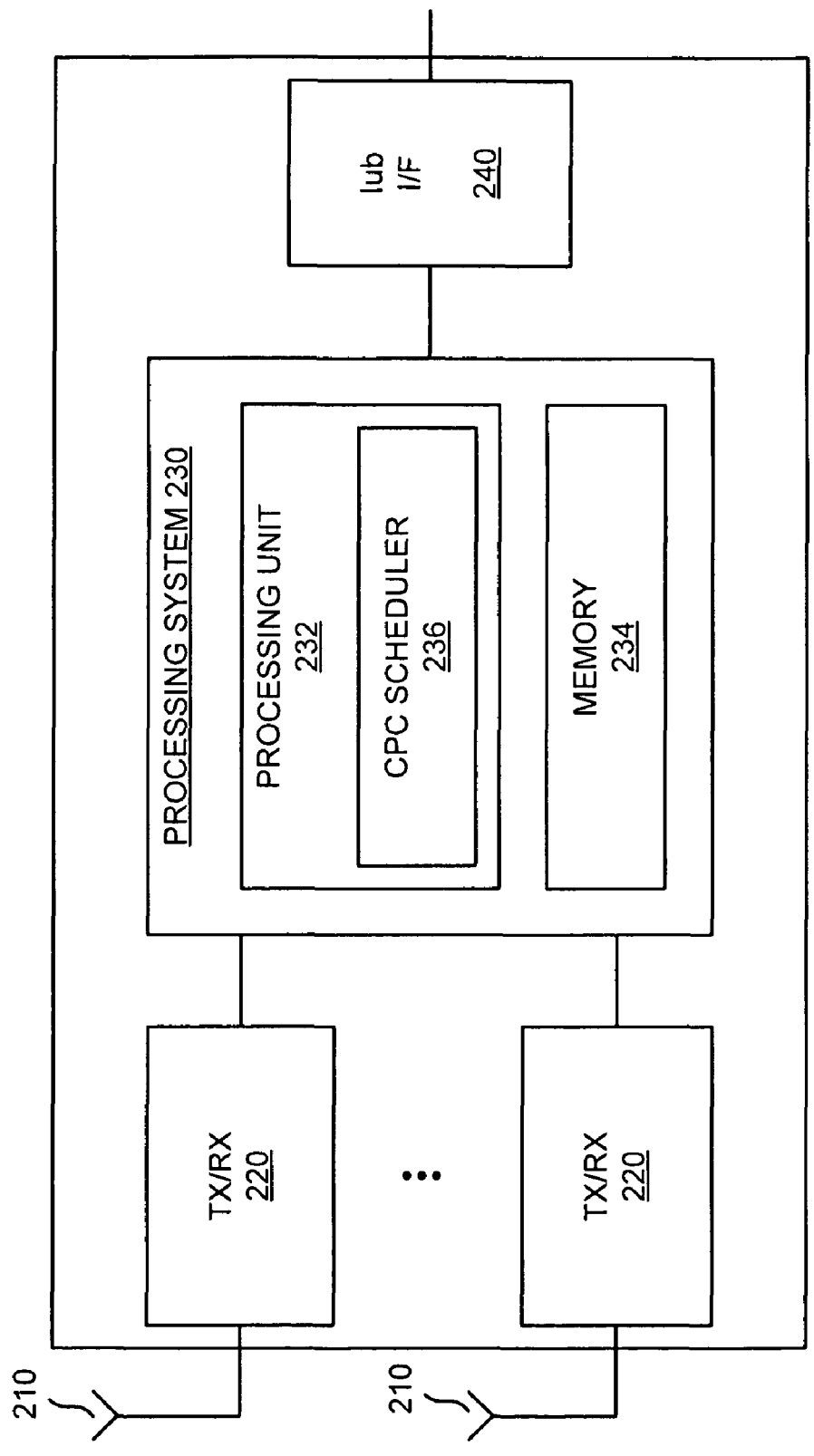
FIG. 2 illustrates a diagram of exemplary components of a base station depicted FIG. 1.

FIG. 2 illustrates a diagram of exemplary components of base station 122. As shown in FIG. 2, base station 122 may include antennas 210, transceivers (TX/RX) 220, a processing system 230, and an Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 110, via antennas 210.

Processing system 230 may control the operation of base station 122. Processing system 230 may also process information received via transceivers 220 and Iub interface 240. Processing system 230 may further measure quality and strength of connection, may determine the frame error rate (FER), and may transmit this information to radio network controller 124. As illustrated, processing system 230 may include a processing unit 232 and a memory 234.

Processing unit 232 may include one or more processors, microprocessors, application specific integrated circuits (ASICs), field programmable gate arrays (FPGAs), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may transmit control messages and/or data messages, and may cause those control messages and/or data messages to be transmitted via transceivers 220 and/or Iub interface 240. Processing unit 232 may also process control messages and/or data messages received from transceivers 220 and/or Iub interface 240. In one embodiment, processing unit 232 may include a CPC scheduler 236.

Memory 234 may include a random access memory (RAM), a read-only memory (ROM), and/or another type of memory to store data and instructions that may be used by processing unit 232.

CPC scheduler 236 may include hardware and/or a combination of hardware and software that performs operations described herein. In one embodiment, CPC scheduler 236 may perform the operations described herein as being performed by base station 122. In another embodiment, CPC scheduler 236 may be provided in radio network controller 124, and radio network controller 124 may perform some or all of the operations described herein as being performed by base station 122. Further details of CPC scheduler 236 are provided below in connection with, for example, FIGS. 4, 5, and 9.

Iub interface 240 may include one or more line cards that allow base station 122 to transmit data to and receive data from a radio network controller 124.

As described herein, base station 122 may perform certain operations in response to processing unit 232 (e.g., CPC scheduler 236) executing software instructions of an application contained in a computer-readable medium, such as memory 234. A computer-readable medium may be defined as a physical or logical memory device. A logical memory device may include memory space within a single physical memory device or spread across multiple physical memory devices. The software instructions may be read into memory 234 from another computer-readable medium or from another device via antennas 210 and transceivers 220. The software instructions contained in memory may cause processing unit 232 (e.g., CPC scheduler 236) to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 122, in other embodiments, base station 122 may contain fewer, different, differently arranged, or additional components than depicted in FIG. 2. In still other embodiments, one or more components of base station 122 may perform one or more other tasks described as being performed by one or more other components of base station 122.

Figure 3A:
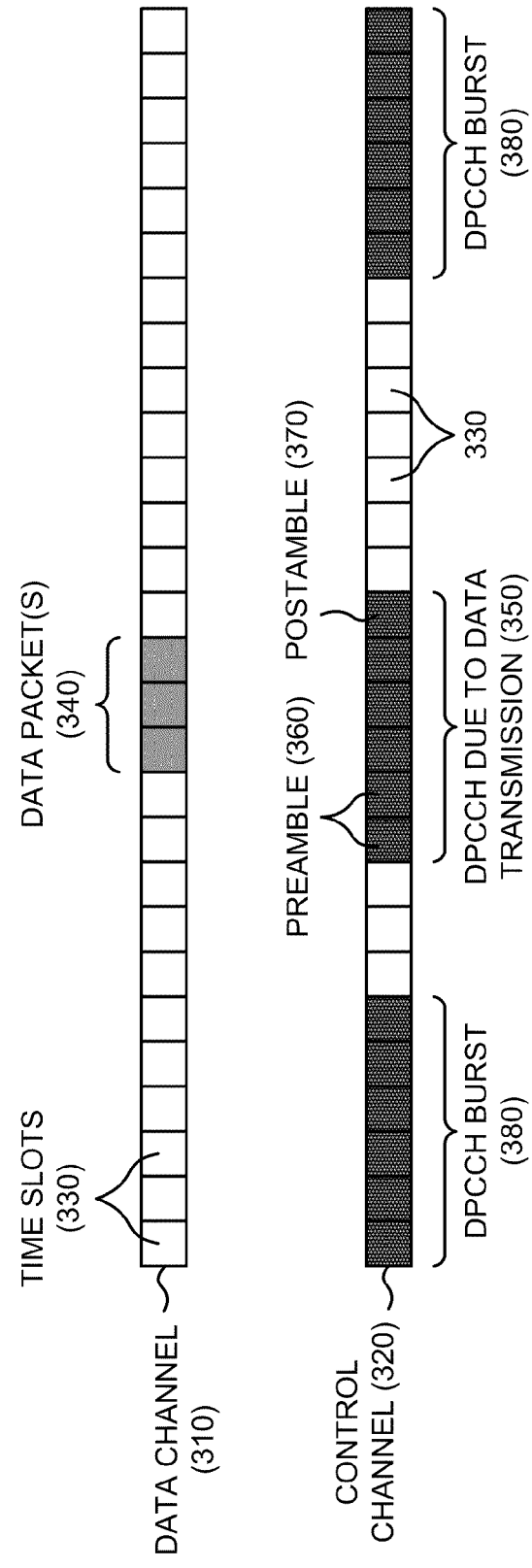
FIG. 3A depicts a diagram of exemplary data channel and control channel signals capable of being transmitted between user equipment and a base station illustrated in FIG. 1.

FIGS. 3A and 3B depict a diagram of exemplary data channel and control channel signals 300 capable of being transmitted between user equipment 110 and base station 122. As shown in FIGS. 3A and 3B, a data channel 310 and a control channel 320 may each include one or more time slots 330. In one example, three time slots 330 may correspond to a one millisecond TTI.

Data channel 310 may include a signal capable of being transmitted via a data channel (e.g., a dedicated physical data channel (DPDCH)) provided between user equipment 110 and base station 122. In one example, data channel 310 may include VoIP transmissions, Internet surfing transmissions, and/or other sporadic (or periodic) data transmissions. As further shown in FIG. 3A, data channel 310 may include one or more data packets 340, such as VoIP data packets, other periodic data packets, etc. In one example, each of data packets 340 may be associated with a corresponding one of time slots 330. In other examples, two or more data packets 340 may be associated with a corresponding one of time slots 330.

Control channel 320 may include a signal capable of being transmitted via a control channel (e.g., a dedicated physical control channel (DPCCH)) provided between user equipment 110 and base station 122. In one example, control channel 320 may include a power control signal (e.g., a DPCCH signal). As further shown in FIG. 3A, control channel 320 may include a power control signal (or DPCCH) 350 associated with one or more corresponding time slots 330. In one example, DPCCH 350 may be associated with a gated power control signal provided by base station 122 to user equipment 110, and may be due to a data transmission on data channel 310. DPCCH 350 may provide a two time slot DPCCH preamble 360 (e.g., prior to data packet(s) 340) and a DPCCH postamble 370 (e.g., after data packet(s) 340). With such a short DPCCH preamble, control channel 320 may be unable to keep up with the quickly-changing data channel 310, and data packets(s) 340 may need to be retransmitted or may be lost.

Data channel 310 may occur in a timing pattern (e.g., VoIP data may be transmitted every twenty milliseconds), and control channel 320 may occur in a timing pattern (e.g., according to a gating configuration implemented by user equipment 110). For example, data packet(s) 340 may be transmitted at certain time slots 330, and DPCCH bursts (e.g., UE DTX bursts) 380 may be transmitted at other time slots 330. However, since data channel 310 and control channel 320 may not be synchronized with each other (e.g., if data channel 310 is sporadic), the pattern associated with data channel 310 may be misaligned with the pattern associated with control channel 320. Thus, data packet(s) 340 may be misaligned with DPCCH bursts 380.

In such a situation, embodiments described herein may be implemented and may attempt to align the timing of data channel 310 with the timing of control channel 320. For example, embodiments described herein may attempt to align time slots 330 associated with data packet(s) 340 with time slots 330 associated with DPCCH bursts 380. As shown in FIG. 3B, embodiments described herein may align data packet(s) 340 with DPCCH bursts 380, which may eliminate the need for DPCCH 350. Such an alignment may result in a DPCCH preamble 360 (e.g., prior to data packet(s) 340) that exceeds the standard two time slot preamble.

Although FIGS. 3A and 3B show exemplary information associated with data channel and control channel signals 300, in other embodiments, data channel and control channel signals 300 may include less, different, differently arranged, or additional information than depicted in FIGS. 3A and 3B.

FIG. 4 depicts a diagram of exemplary interactions among components of an exemplary portion 400 of network 100. As illustrated, exemplary network portion 400 may include user equipment 110 and base station 122 (e.g., including CPC scheduler 236). User equipment 110 and base station 122 may include the features described above in connection with, for example, FIG. 1. CPC scheduler 236 may include the features described above in connection with FIG. 2.

As further shown in FIG. 4, base station 122 (e.g., via CPC scheduler 236) may receive delay information 410 associated with an absolute grant channel (AGCH) established between user equipment 110 and base station 122. The absolute grant transmitted to user equipment 110 may contain information about a maximum packet size that user equipment 110 can use per transmission attempt. Delay information 410 may include information associated with processing delays and/or transmission delays of absolute grants transmitted via the absolute grant channel. In other embodiments, base station 122 (e.g., via CPC scheduler 236) may receive other information, such as channel conditions associated with a control channel and/or a data channel established between user equipment 110 and base station 122.

Base station 122 (e.g., via CPC scheduler 236) may determine a gating configuration 420 for the control channel based on delay information 410, and may transmit gating configuration 420 to user equipment 110. For example, base station 122 may analyze delay information 410, and may create gating configuration 420 based on the processing/transmission delays associated with the absolute grant channel. Gating configuration 420 may include information associated with a gated control signal (e.g., information as to when base station 122 periodically sends (or "gates") the power control (e.g., DPCCH) signaling). User equipment 110 may transmit a gated control signal 430 to base station 122 (e.g., via a control channel established between user equipment 110 and base station 122) based on gating configuration 420. Gated control signal 430 may include a signal capable of being transmitted via a control channel (e.g., a dedicated physical control channel (DPCCH)) provided between user equipment 110 and base station 122. In one embodiment, gated control signal 430 may include a gated power control signal (e.g., a gated DPCCH signal).

Base station 122 (e.g., via CPC scheduler 236) may estimate a size of an absolute grant (e.g., a power ratio (PR)) based on, for example, uplink interference headroom (e.g., as provided by the channel conditions). In an uplink enhanced dedicated channel (E-DCH), the interference "headroom" includes an amount of a shared resource (e.g., a transmit power or interference) left to be allocated to one or more user equipment 110 to transmit in the uplink. In one example, CPC scheduler 236 may estimate the size of the absolute grant as a certain size (e.g., size "G") based on the uplink interference headroom.

Base station 122 (e.g., via CPC scheduler 236) may synchronize time slots for data packets (e.g., to be provided via the data channel) and DPCCH bursts (e.g., provided by gated control signal 430) based on the determined gating configuration, and may schedule transmission of the data packets based on the synchronized time slots. Further details of synchronizing the time slots for the data packets and the DPCCH bursts are provided below in connection with, for example, FIG. 6.

Data transmissions (e.g., VoIP transmissions) may be sent by user equipment 110 when user equipment 110 receives an absolute grant that is greater than zero (e.g., a power ratio (PR) value greater than zero). If the absolute grant is of sufficient size (e.g., greater than zero), user equipment 110 may send a data packet (e.g., in the form of radio link control (RLC) protocol data units (PDUs)) in a single transmission time interval (TTI). If the absolute grant is zero, user equipment 110 may buffer RLC PDUs until a positive absolute grant is received by user equipment 110. Base station 122 (e.g., CPC scheduler 236) may utilize the features associated with the absolute grant to schedule transmission of data packets (e.g., via the data channel) during transmission time intervals (TTIs) that are optimal with respect to gated control signal 430 (e.g., the DPCCH bursts provided by gated control signal 430). Such an arrangement may control the timing of the data transmissions and gated control signal (e.g., DPCCH bursts) so that the data transmissions are associated with DPCCH preambles that exceed the standard two time slot preamble.

For example, as shown in FIG. 4, base station 122 (e.g., via CPC scheduler 236) may transmit a first absolute grant (e.g., a power ratio (PR) of zero) 440 to user equipment 110 based on the scheduled transmissions of the data packets (e.g. if no data transmissions are to be sent by user equipment 110). User equipment 110 may receive first absolute grant 440, and may prevent data from being transmitted, as indicated by reference number 450. If data transmissions are to be sent by user equipment 110 (e.g., so that the data transmissions are aligned with the DPCCH bursts), base station 122 (e.g., via CPC scheduler 236) may transmit a second absolute grant (e.g., a power ratio (PR) of a value "G" greater than zero) 460 to user equipment 110 based on the scheduled transmissions of the data packets. User equipment 110 may receive second absolute grant 460, and may provide a data transmission 470 in response thereto. Base station 122 (e.g., via CPC scheduler 236) may also determine if a new gating configuration of the control channel needs to be determined (e.g., based on changing channel conditions, etc.), and may update the scheduled transmissions of the data packets based on the determination.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
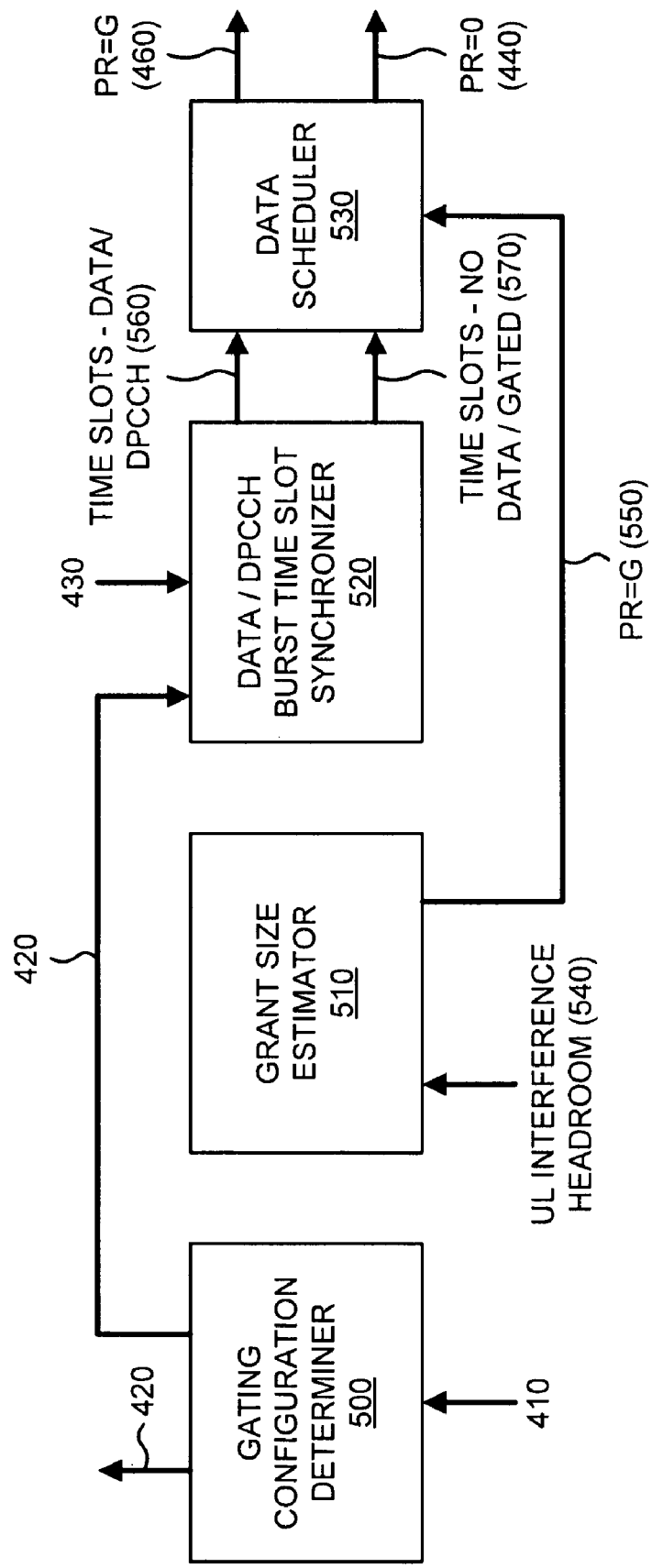
FIG. 5 illustrates a diagram of exemplary functional components of a continuous packet connectivity (CPC) scheduler of the base station depicted in FIG. 2.

FIG. 5 illustrates a diagram of exemplary functional components of CPC scheduler 236 of base station 122. In one embodiment, the functions described in connection with FIG. 5 may be performed by processing unit 232, via CPC scheduler 236 (FIG. 2). As shown, CPC scheduler 236 may include a gating configuration determiner 500, a grant size estimator 510, a data/DPCCH burst time slot synchronizer 520, and/or a data scheduler 530.

Gating configuration determiner 500 may include any hardware or combination of hardware and software that may receive delay information 410 associated with an absolute grant channel (AGCH) established between user equipment 110 and base station 122, and may transmit gating configuration 420. Gating configuration determiner 500 may also receive channel conditions associated with the control channel and/or the data channel established between user equipment 110 and base station 122. Gating configuration determiner 500 may provide gating configuration 420 to user equipment 420 and to data/DPCCH burst time slot synchronizer 520.

Grant size estimator 510 may include any hardware or combination of hardware and software that may receive interference headroom 540 associated with an uplink (UL) provided between user equipment 110 and base station 122. UL interference headroom 540 may include, for example, an amount of a shared resource (e.g., a transmit power or interference) left to be allocated to one or more user equipment 110 to transmit in the uplink. Grant size estimator 510 may estimate a size 550 of an absolute grant (e.g., a power ratio (PR)) based on UL interference headroom 540 (e.g., as provided by the channel conditions). In one example, grant size estimator 510 may estimate size 550 of the absolute grant as a certain size (e.g., size "G" greater than zero) based on UL interference headroom 540.

Data/DPCCH burst time slot synchronizer 520 may include any hardware or combination of hardware and software that may receive gating configuration 420 from gating configuration determiner 500 and gated control signal 430 from user equipment 110. Data/DPCCH burst time slot synchronizer 520 may synchronize time slots for data packets (e.g., to be provided via the data channel) and DPCCH bursts (e.g., provided by gated control signal 430) based on gating configuration 420. For example, data/DPCCH burst time slot synchronizer 520 may synchronize time slots 560 when data packets and DPCCH bursts are to be transmitted by user equipment 110, and may synchronize time slots 570 when no data packets and DPCCH bursts (e.g., the DPCCH is "gated") are to be transmitted by user equipment 110.

Data scheduler 530 may include any hardware or combination of hardware and software that may receive size 550 of the absolute grant from grant size estimator 510, may receive synchronized time slots 560 and 570 from data/DPCCH burst time slot synchronizer 520, and may schedule transmission of the data packets based on synchronized time slots 560 and 570. For example, data scheduler 530 may transmit first absolute grant (e.g., a power ratio (PR) of zero) 440 to user equipment 110 based on the scheduled transmissions of the data packets (e.g. if no data transmissions are to be sent by user equipment 110). If data transmissions are to be sent by user equipment 110 (e.g., so that the data transmissions are aligned with the DPCCH bursts), data scheduler 530 may transmit second absolute grant (e.g., a power ratio (PR) of a value "G" greater than zero) 460 to user equipment 110 based on the scheduled transmissions of the data packets.

Although FIG. 5 shows exemplary functional components of CPC scheduler 236, in other implementations, CPC scheduler 236 may contain fewer, different, differently arranged, or additional functional components than depicted in FIG. 5. In still other implementations, one or more functional components of CPC scheduler 236 may perform one or more other tasks described as being performed by one or more other functional components of CPC scheduler 236.

Figure 6:
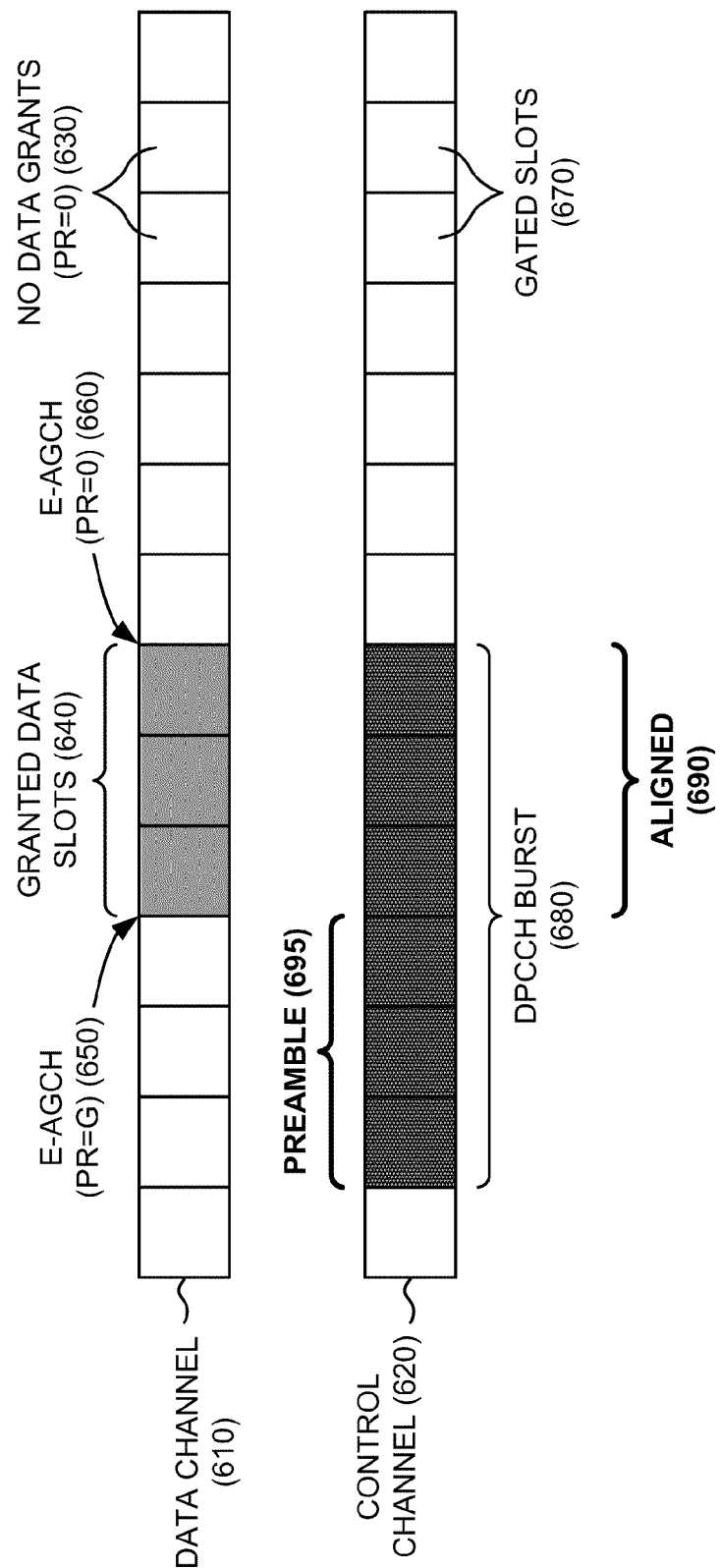
FIG. 6 depicts a diagram of exemplary data channel and control channel signals capable of being transmitted between user equipment and a base station illustrated in FIG. 1, where the control channel signal is gated and provides a preamble that exceed the standard two time slot preamble.

FIG. 6 depicts a diagram of exemplary data channel and control channel signals 600 capable of being transmitted between user equipment 110 and base station 122. In one embodiment, data channel and control channel signals 600 may correspond to data channel signals (e.g., no data transmission 450 and data transmission 470) and control channel signals (e.g., gated control signal 430), respectively, described above in connection with FIG. 4. As shown in FIG. 6, data channel and control channel signals 600 may include a data channel 610 and a control channel 620.

Data channel 610 may include a signal capable of being transmitted via a data channel (e.g., a dedicated physical data channel (DPDCH)) provided between user equipment 110 and base station 122. In one example, data channel 610 may include VoIP transmissions, Internet (or web) surfing transmissions, and/or other sporadic (or periodic) data transmissions. As further shown in FIG. 6, data channel 610 may include one or more time slots 630 where data is not transmitted via the data channel, and one or more time slots 640 where data is transmitted (or granted) via the data channel. Data may not be transmitted during time slots 630 since base station 122 (e.g., via CPC scheduler 236) may transmit an absolute grant (e.g., PR=0) that prevents user equipment 110 from transmitting data during these time slots. Data (e.g., one or more data packets, such as VoIP data packets) may be transmitted during time slots 640 since base station 122 (e.g., via CPC scheduler 236) may transmit an absolute grant (e.g., PR=G) 650 (e.g., that enables user equipment 110 to transmit data) at the beginning of time slots 640 and may transmit an absolute grant (e.g., PR=0) 660 (e.g., that prevents user equipment 110 from transmitting data) at the end of time slots 640. In one example, a single data packet may be associated with a corresponding one of time slots 640. In other examples, two or more data packets may be associated with a corresponding one of time slots 640.

Control channel 620 may include a signal capable of being transmitted via a control channel (e.g., a dedicated physical control channel (DPCCH)) provided between user equipment 110 and base station 122. In one example, control channel 620 may include a power control signal (e.g., a DPCCH signal). As further shown in FIG. 6, control channel 620 may include one or more time slots 670 where a power control (or DPCCH) signal is gated (not transmitted), and a power control signal (or DPCCH) burst 680 associated with one or more corresponding time slots. The power control signal may not be transmitted during time slots 670 in accordance with a gating configuration (e.g., the UE DTX/DRX method) utilized by base station 122. In one example, DPCCH burst 680 may be associated with gated control signal 430 (FIG. 4) provided by base station 122 to user equipment 110.

As shown in FIG. 6, the time slots associated with DPCCH burst 680 may be aligned with time slots 640 of data channel 610. For example, an ending time slot associated with DPCCH burst 680 may be aligned with an end of granted data time slots 640, as indicated by reference number 690. As further shown in FIG. 6, such an alignment may result in a DPCCH preamble 695 (e.g., prior to granted data time slots 640) that exceeds the standard two time slot preamble. DPCCH preamble 695 may enable control channel 620 to keep up with the quickly-changing data channel 610.

Although FIG. 6 shows exemplary information associated with data channel and control channel signals 600, in other embodiments, data channel and control channel signals 600 may include less, different, differently arranged, or additional information than depicted in FIG. 6.

Figure 7:
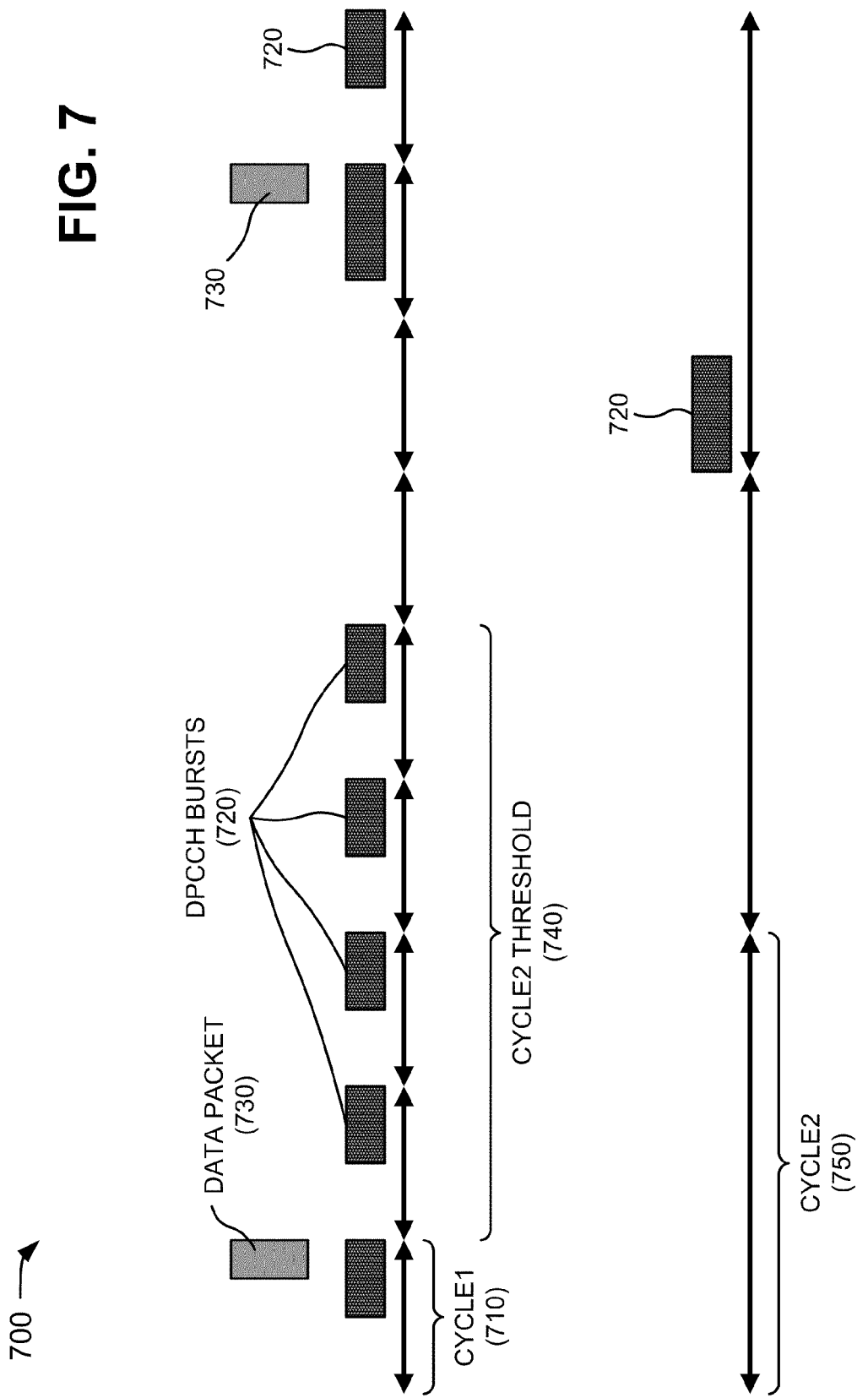
FIG. 7 illustrates a diagram of exemplary control channel gating cycles capable of being transmitted between user equipment and a base station illustrated in FIG. 1.

FIG. 7 illustrates a diagram of exemplary control channel gating cycles 700 that may exist between user equipment 110 and base station 122. In one embodiment, control channel gating cycles 700 may be associated with a gating configuration generated by base station 122. As shown, control gating cycles 700 may include a first gating cycle ("CYCLE1") 710, and DPCCH bursts 720 and data packets 730 associated with first gating cycle 710.

First gating cycle 710 may include a cycle length (e.g., as shown by two-headed arrows) and a burst length (e.g., a length associated with DPCCH bursts 720). An offset (e.g., a UE DTX/DRX offset) may be used during first gating cycle 710 to place DPCCH bursts 720 at the end of first gating cycle 710. DPCCH bursts 720 may include bursts associated with a power control signal (e.g., a DPCCH signal). Data packets 730 may include data packets capable of being transmitted via a data channel (e.g., a dedicated physical data channel (DPDCH)) provided between user equipment 110 and base station 122. After the first data packet 730 is transmitted, the power control signal may be gated according to first gating cycle 710.

User equipment 110 may use first gating cycle 710 until a time (e.g., a second gating cycle ("CYCLE2") threshold 740) expires, and then user equipment 110 may transition to a second gating cycle 750. Second gating cycle 750 may include a cycle length (e.g., as shown by two-headed arrows) and a burst length (e.g., a length associated with DPCCH bursts 720) that are different than the cycle length and burst length associated with first gating cycle 710. User equipment 110 may use second gating cycle 750 until the next data packet 730 is transmitted. The next data packet 730 transmission may trigger user equipment 110 to switch back to first gating cycle 710.

To optimize performance for periodic data transmissions (e.g., VoIP), second gating cycle 750 may be configured to have less DPCCH bursts 720. In second gating cycle 750, it may be possible to use a longer time slot preamble than the time slot preamble use for first gating cycle 710. The longer time slot preamble may be sufficient to permit the power control signal to adjust before the next data transmission. During first gating cycle 710, DPCCH bursts 720 may be more frequent so a shorter time slot preamble may suffice.

Figure 8:
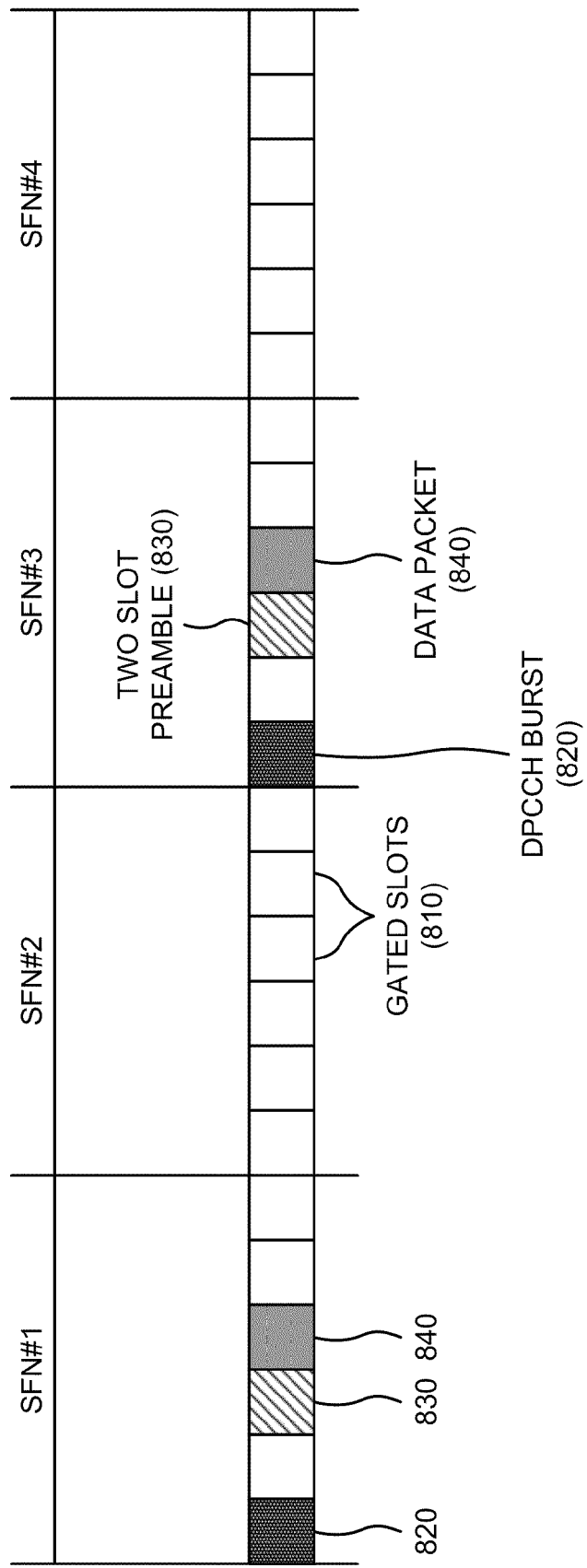
FIG. 8 depicts a diagram of exemplary data channel and control channel signals capable of being transmitted between user equipment and a base station illustrated in FIG. 1.

Using the UE DTX/DRX offset parameter with first gating cycle 710 burst lengths may provide a longer time slot preamble for first gating cycle 710. However, there may be no way to know exactly where data packets (e.g., data packets 730) may appear relative to DPCCH bursts 720 because the data packets (e.g., VoIP packets) may have a random offset in single frequency networks (SFNs). FIG. 8 illustrates this phenomenon and depicts a diagram of exemplary data channel and control channel signals 800 capable of being transmitted between user equipment 110 and base station 122. As shown, data channel and control channel signals 800 may be associated with four single frequency networks (e.g., "SFN#1," "SFN#2," "SFN#3," and "SFN#4"), and may include gated time slots 810, DPCCH bursts 820, two time slot preambles 830, and data packets 840. It may be assumed, for example, that each block (or slot) may correspond to a two millisecond transmission time interval (TTI).

Gated time slots 810 may include time slots where a power control signal (e.g., a DPCCH signal) is gated (not transmitted). DPCCH bursts 820 may include a gated power control signal transmitted via a control channel (e.g., a DPCCH) provided between user equipment 110 and base station 122. As shown in FIG. 8, DPCCH bursts 820 may occur periodically (e.g., every twenty milliseconds) in first TTIs of corresponding SFNs. Two time slot preambles 830 may include DPCCH preambles that occur periodically (e.g., every twenty milliseconds) in third TTIs of corresponding SFNs. Data packets 830 may include VoIP data packets (or other periodic data packets) that occur periodically (e.g., every twenty milliseconds) in fourth TTIs of corresponding SFNs.

Figure 9:
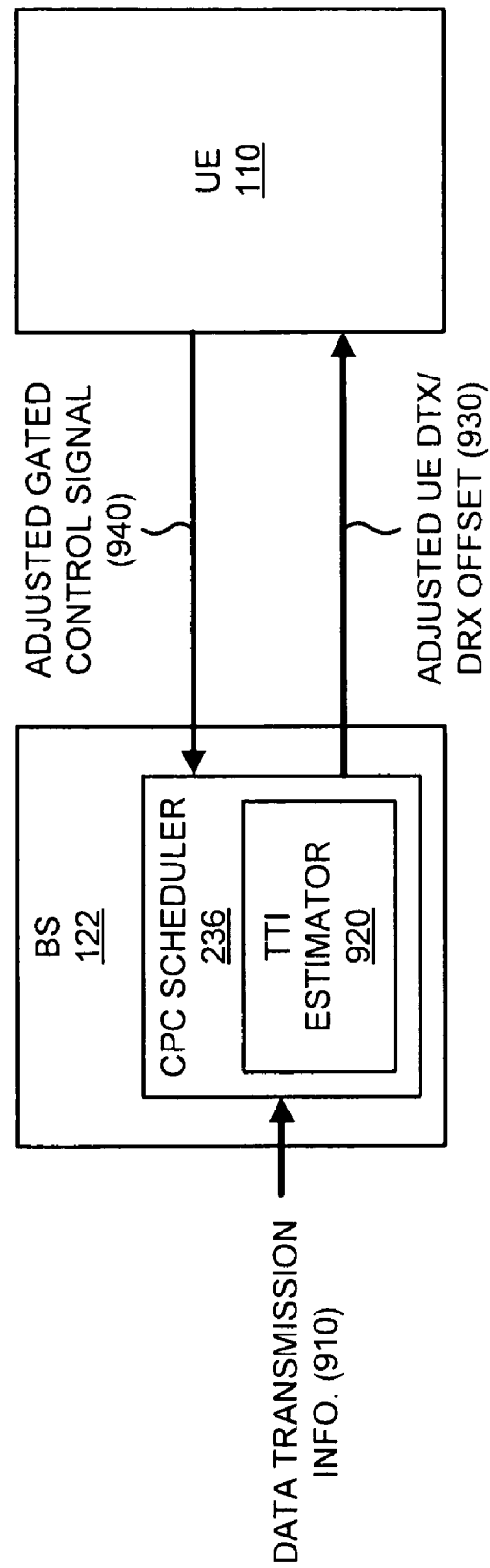
FIG. 9 illustrates a diagram of exemplary interactions among components of an exemplary portion of the network depicted in FIG. 1.

The random offset of data packets 840 (e.g., VoIP packets) may make aligning DPCCH bursts 820 with data packets 840 very difficult. However, since data packets 840 may be periodically transmitted (e.g., every zero to twenty milliseconds), base station 122 (e.g., via CPC scheduler 236) may utilize this information to align data packets 840 with DPCCH bursts 820 in an optimal manner. FIG. 9 illustrates how base station 122 may perform such an alignment and depicts a diagram of exemplary interactions among components of an exemplary portion 900 of network 100. As shown, exemplary network portion 900 may include user equipment 110 and base station 122 (e.g., including CPC scheduler 236). User equipment 110 and base station 122 may include the features described above in connection with, for example, FIG. 1. CPC scheduler 236 may include the features described above in connection with FIG. 2.

As further shown in FIG. 9, base station 122 (e.g., via CPC scheduler 236) may receive data transmission information 910. Data transmission information 910 may include information (e.g., a data transmission rate) associated with a data channel provided between user equipment 110 and base station 122. In one example, data transmission information 910 may include a VoIP transmission rate. CPC scheduler 236 may estimate data channel time slots (e.g., that contain data) based on data transmission information 910 using a TTI estimator 920. TTI estimator 920 may include hardware and/or a combination of hardware and software that may estimate which TTIs (e.g., associated with a data channel signal) will contain data packets (e.g., VoIP packets).

Base station 122 (e.g., via CPC scheduler 236) may adjust a UE DTX/DRX offset parameter 930 based on the estimated data channel time slots (e.g., generated by TTI estimator 920). Adjusted UE DTX/DRX offset parameter 930 may include a UE DXT/DRX offset parameter (e.g., associated with a gated control signal of a control channel provided between user equipment 110 and base station 122) that may be adjusted so that ends of DPCCH bursts match ends of the estimated data channel time slots. Base station 122 (e.g., via CPC scheduler 236) may provide adjusted UE DTX/DRX offset parameter 930 to user equipment 110. User equipment 110 may receive adjusted UE DTX/DRX offset parameter 930, and may adjust a gated control signal 940 based on adjusted UE DTX/DRX offset parameter 930. For example, user equipment 110 may adjust gated control signal 940 so that ends of DPCCH bursts may match ends of the estimated data channel time slots.

Although FIG. 9 shows exemplary components of network portion 900, in other implementations, network portion 900 may contain fewer, different, differently arranged, or additional components than depicted in FIG. 9. In still other implementations, one or more components of network portion 900 may perform one or more other tasks described as being performed by one or more other components of network portion 900.

FIGS. 10-12 depict flow charts of an exemplary process 1000 for scheduling data channel signals with respect to control channel signals according to embodiments described herein. In one embodiment, process 1000 may be performed by base station 122 (e.g., via CPC scheduler 236). In other embodiments, process 1000 may be performed by another device (e.g., radio network controller 124) or group of devices (e.g., communicating with base station 122).

As illustrated in FIG. 10, process 1000 may begin with receipt of delay information, associated with control and data channels (block 1010), determining a gating configuration of the control channel based on the received delay information (block 1020), and receiving a gated control signal based on the gating configuration (block 1030). For example, in embodiments described above in connection with FIG. 4, base station 122 (e.g., via CPC scheduler 236) may receive delay information 410 associated with an absolute grant channel (AGCH) established between user equipment 110 and base station 122. Base station 122 (e.g., via CPC scheduler 236) may determine gating configuration 420 for the control channel based on delay information 410, and may transmit gating configuration 420 to user equipment 110. Base station 122 (e.g., via CPC scheduler 236) may receive gated control signal 430 from user equipment 110 (e.g., via the control channel) based on gating configuration 420. Gated control signal 430 may include a signal capable of being transmitted via a control channel (e.g., a DPCCH) provided between user equipment 110 and base station 122. In one example, gated control signal 430 may include a gated power control signal (e.g., a gated DPCCH signal).

As further shown in FIG. 10, a size of a grant may be estimated based on uplink interference headroom (block 1040), time slots for data packets and DPCCH bursts may be synchronized based on the gating configuration (block 1050), and transmissions of the data packets may be scheduled based on the synchronized time slots (block 1060). For example, in embodiments described above in connection with FIG. 4, base station 122 (e.g., via CPC scheduler 236) may estimate a size of an absolute grant (e.g., a power ratio (PR)) based on uplink interference headroom (e.g., as provided by the channel conditions). In one example, base station 122 (e.g., via CPC scheduler 236) may estimate the size of the absolute grant as a certain size (e.g., size "G") based on the uplink interference headroom. CPC scheduler 236 may synchronize time slots for data packets (e.g., to be provided via the data channel) and DPCCH bursts (e.g., provided by gated control signal 430) based on the determined gating configuration, and may schedule transmission of the data packets based on the synchronized time slots.

Returning to FIG. 10, a grant (e.g., PR=0 or PR=G) may be transmitted based on the scheduled transmissions of the data packets (block 1070), and it may be determined if a new gating configuration is to be determined (block 1080). If a new gating configuration is to be determined (block 1070—YES), process 1000 may return to process block 1010. Otherwise (block 1070—NO), process 1000 may cease. For example, in embodiments described above in connection with FIG. 4, base station 122 (e.g., via CPC scheduler 236) may transmit first absolute grant (e.g., a power ratio (PR) of zero) 430 to user equipment 110 based on the scheduled transmissions of the data packets (e.g. if no data transmissions are to be sent by user equipment 110). If data transmissions are to be sent by user equipment 110 (e.g., so that the data transmissions are aligned with the DPCCH bursts), base station 122 (e.g., via CPC scheduler 236) may transmit second absolute grant (e.g., a power ratio (PR) of a value "G" greater than zero) 450 to user equipment 110 based on the scheduled transmissions of the data packets. Base station 122 (e.g., via CPC scheduler 236) may also determine if a new gating configuration of the control channel needs to be determined (e.g., based on changing channel conditions, a change in gated control signal 430, etc.), and may update the scheduled transmissions of the data packets based on the determination.

Process block 1050 may include the process blocks depicted in FIG. 11. As illustrated in FIG. 11, process block 1050 may include scheduling the transmissions of the data packets when a time slot includes data and a DPCCH burst (block 1100), and not scheduling the transmissions of data packets when a time slot includes no data and is a gated slot (block 1110). For example, in embodiments described above in connection with FIG. 6, data channel 610 may include one or more time slots 630 where data is not transmitted via the data channel. Data may not be transmitted during time slots 630 since base station 122 (e.g., via CPC scheduler 236) may transmit an absolute grant (e.g., PR=0) that prevents user equipment 110 from transmitting data. Control channel 620 may include one or more time slots 670 where a power control (or DPCCH) signal is gated (not transmitted), and power control signal (or DPCCH) burst 680 associated with one or more corresponding time slots. The power control signal may not be transmitted during time slots 670 in accordance with a gating configuration (e.g., the UE DTX/DRX method) utilized by base station 122.

Process block 1060 may include the process blocks depicted in FIG. 12. As illustrated in FIG. 12, process block 1060 may include transmitting a grant (e.g., PR=G) when a time slot includes data and a DPCCH burst (block 1200), and transmitting a grant (e.g., PR=0) when a time slot includes no data and is a gated slot (block 1210). For example, in embodiments described above in connection with FIG. 6, data channel 610 may include one or more time slots 630 where data is not transmitted via the data channel, and one or more time slots 640 where data is transmitted (or granted) via the data channel. Data may not be transmitted during time slots 630 since base station 122 (e.g., via CPC scheduler 236) may transmit an absolute grant (e.g., PR=0) that prevents user equipment 110 from transmitting data at these time slots. Data may be transmitted during time slots 640 since base station 122 (e.g., via CPC scheduler 236) may transmit absolute grant (e.g., PR=G) 650 (e.g., that enables user equipment 110 to transmit data) at the beginning of time slots 640 and may transmit absolute grant (e.g., PR=0) 660 (e.g., that prevents user equipment 110 from transmitting data) at the end of time slots 640. Control channel 620 may include one or more time slots 670 where a power control (or DPCCH) signal is gated (not transmitted), and power control signal (or DPCCH) burst 680 associated with one or more corresponding time slots. The power control signal may not be transmitted during time slots 670 in accordance with a gating configuration (e.g., the UE DTX/DRX method) utilized by base station 122.

FIG. 13 illustrates a flow chart of an exemplary process 1300 for scheduling control channel signals with respect to data channel signals according to embodiments described herein. In one embodiment, process 1300 may be performed by base station 122 (e.g., via CPC scheduler 236). In other embodiments, process 1300 may be performed by another device (e.g., radio network controller 124) or group of devices (e.g., communicating with base station 122).

As illustrated in FIG. 13, process 1300 may include receiving a data transmission rate associated with a data channel (block 1310), and estimating data channel time slots that contain data based on the data transmission rate (block 1320). For example, in embodiments described above in connection with FIG. 9, base station 122 (e.g., via CPC scheduler 236) may receive data transmission information 910. Data transmission information 910 may include information (e.g., a data transmission rate) associated with a data channel provided between user equipment 110 and base station 122. CPC scheduler 236 may estimate data channel time slots (e.g., slots that contain data) based on data transmission information 910 using TTI estimator 920. In one example, TTI estimator 920 may estimate which TTIs (e.g., associated with a data channel signal) will contain data packets (e.g., VoIP packets).

As further shown in FIG. 13, a UE DTX/DRX offset parameter may be adjusted based on the estimated data channel time slots (block 1330), the adjusted UE DTX/DRX offset parameter may be provided to user equipment, where the user equipment may adjust a gated control signal based on the adjusted UE DTX/DRX offset parameter (block 1340). For example, in embodiments described above in connection with FIG. 9, base station 122 (e.g., via CPC scheduler 236) may adjust UE DTX/DRX offset parameter 930 based on the estimated data channel time slots (e.g., generated by TTI estimator 920). Adjusted UE DTX/DRX offset parameter 930 may include a UE DXT/DRX offset parameter that may be adjusted so that ends of DPCCH bursts may match ends of the estimated data channel time slots. Base station 122 (e.g., via CPC scheduler 236) may provide adjusted UE DTX/DRX offset parameter 930 to user equipment 110. User equipment 110 may receive adjusted UE DTX/DRX offset parameter 930, and may adjust gated control signal 940 based on adjusted UE DTX/DRX offset parameter 930. In one example, user equipment 110 may adjust gated control signal 940 so that ends of DPCCH bursts may match ends of the estimated data channel time slots.

Embodiments described herein may provide systems and/or methods that control relative positions of control signal (e.g., DPCCH) bursts and data (e.g., VoIP) transmissions so that the data transmissions are associated with DPCCH preambles that exceed the standard two time slot preamble.

The systems and/or methods described herein may handle bundled data, such as bundled VoIP, and may provide DPCCH preambles that exceed the standard two time slot preamble, which is required for periodic data transmissions (e.g., such as VoIP transmissions, Internet surfing, etc.), without requiring a change in the 3GPP standard. The systems and/or methods may enhance the performance of uplink DPCCH gating by reducing DPCCH transmissions in cases where DPCCH transmissions are unnecessary. The reduced DPCCH transmissions may reduce uplink interference, which may provide higher uplink capacity and may reduce battery consumption in the user equipment.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 10-13, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, in a wireless environment that includes a first device, a second device, and a control channel and a data channel established in an uplink between the first device and the second device, the method comprising: determining, via the first device, a gating configuration associated with the control channel; receiving, via the first device, a gated control signal, via the control channel, based on the gating configuration; synchronizing, via the first device, time slots for signal bursts associated with the gated control signal and time slots for data packets associated with the data channel; scheduling, via the first device, transmissions of the data packets based on the synchronized time slots; generating, via the first device, an absolute grant based on the scheduled transmissions of the data packets; and transmitting, via the first device, the absolute grant to the second device; scheduling, via the first device, transmission of a particular data packet when a particular time slot includes an end of the particular data packet aligned with an end of a control signal burst, and preventing, via the first device, transmission of the particular data packet when the particular data packet is not aligned with the control signal burst in the particular time slot.

2. The method of claim 1, further comprising:
receiving, via the first device, delay information associated with the control channel and the data channel; and
scheduling, via the first device, the transmissions of the data packets based on the delay information.

3. The method of claim 2, where the delay information comprises one or more of:
processing delays associated with the first device and the second device, or
transmission delays associated with the control channel and the data channel.

4. The method of claim 1, where the data packets comprise voice-over-Internet protocol (VoIP) data packets, the control channel comprises a dedicated physical control channel (DPCCH), and the signal bursts comprise DPCCH bursts.

5. The method of claim 1, where the first device comprises a base station (BS), and the second device comprises a user equipment (UE).

6. The method of claim 1, further comprising:
estimating, via the first device, a size of the absolute grant based on an interference headroom associated with the data channel.

7. A method, in a wireless environment that includes a first device, a second device, and a control channel and a data channel established in an uplink between the first device and the second device, the method comprising: determining, via the first device, a gating configuration associated with the control channel; receiving, via the first device, a gated control signal, via the control channel, based on the gating configuration; synchronizing, via the first device, time slots for signal bursts associated with the gated control signal and time slots for data packets associated with the data channel; scheduling, via the first device, transmissions of the data packets based on the synchronized time slots; generating, via the first device, an absolute grant based on the scheduled transmissions of the data packets; transmitting, via the first device, the absolute grant to the second device; generating, via the first device, an absolute grant equal to a value greater than zero when a particular time slot includes an end of a particular data packet aligned with an end of a control signal burst; and generating, via the first device, an absolute grant equal to zero when the particular data packet is not aligned with the control signal burst in the particular time slot.

8. A base station, comprising: a memory to store a plurality of instructions; and a processor to execute instructions in the memory to: establish a data channel in an uplink between the base station and a user equipment, establish a control channel in the uplink between the base station and the user equipment, determine a gating configuration associated with the control channel, receive a gated control signal, via the control channel, based on the gating configuration, synchronize time slots for signal bursts associated with the gated control signal and time slots for data packets associated with the data channel, schedule transmissions of the data packets based on the synchronized time slots, generate an absolute grant based on the scheduled transmissions of the data packets, and transmit the absolute grant to the user equipment, generate an absolute grant equal to a value greater than zero when a particular time slot includes an end of a particular data packet aligned with an end of a control signal burst, and generate an absolute grant equal to zero when the particular data packet is not aligned with the control signal burst in the particular time slot.

9. The base station of claim 8, where the processor further executes instructions in the memory to:
receive delay information associated with the control channel and the data channel, and
schedule the transmissions of the data packets based on the delay information.

10. The base station of claim 9, where the delay information comprises one or more of:
processing delays associated with the base station and the user equipment, or
transmission delays associated with the control channel and the data channel.

11. The base station of claim 8, where the data packets comprise voice-over-Internet protocol (VoIP) data packets, the control channel comprises a dedicated physical control channel (DPCCH), and the signal bursts comprise a DPCCH burst.

12. The base station of claim 8, where the processor further executes instructions in the memory to:
estimate a size of the absolute grant based on an interference headroom associated with the data channel.

13. A base station, comprising: a memory to store a plurality of instructions; and a processor to execute instructions in the memory to: establish a data channel in an uplink between the base station and a user equipment, establish a control channel in the uplink between the base station and the user equipment, determine a gating configuration associated with the control channel, receive a gated control signal, via the control channel, based on the gating configuration, synchronize time slots for signal bursts associated with the gated control signal and time slots for data packets associated with the data channel, schedule transmissions of the data packets based on the synchronized time slots, generate an absolute grant based on the scheduled transmissions of the data packets, transmit the absolute grant to the user equipment, schedule transmission of a particular data packet when a particular time slot includes an end of the particular data packet aligned with an end of a control signal burst, and prevent transmission of the particular data packet when the particular data packet is not aligned with the a control signal burst in the particular time slot.

14. A base station, comprising:
a memory to store a plurality of instructions: and
a processor to execute instructions in the memory to:
establish a data channel in an uplink between the base station and a user equipment,
establish a control channel in the uplink between the base station and the user equipment,
determine a gating configuration associated with the control channel, receive a gated control signal, via the control channel, based on the gating configuration, synchronize time slots for signal bursts associated with the gated control signal and time slots for data packets associated with the data channel, schedule transmissions of the data packets based on the synchronized time slots, generate an absolute grant based on the scheduled transmissions of the data packets, and transmit the absolute grant to the user equipment;

where each of the signal bursts provide a preamble greater than two time slots with respect to the beginning of a time slot associated with each of the data packets.

* * * * *

UNITED STATES PATENT AND TRADEMARK OFFICE
CERTIFICATE OF CORRECTION

PATENT NO.         : 8,165,099 B2
APPLICATION NO.    : 12/337861
DATED              : April 24, 2012
INVENTOR(S)        : Christoffersson et al.

Page 1 of 1

It is certified that error appears in the above-identified patent and that said Letters Patent is hereby corrected as shown below:

On the Face Page, in Field (73), under "Assignee", in Column 1, Line 2, delete "Stockholm" and insert -- (publ), Stockholm --, therefor.

In Fig. 13, Sheet 14 of 14, for Tag 1340, in Line 3, delete "BASED ON ON" and insert -- BASED ON --, therefor.

In Column 13, Line 27, delete "UE DXT/DRX" and insert -- UE DTX/DRX --, therefor.

In Column 16, Line 1, delete "UE DXT/DRX" and insert -- UE DTX/DRX --, therefor.

In Column 18, Line 57, in Claim 13, delete "the a control" and insert -- the control --, therefor.

In Column 18, Line 60, delete "instructions:" and insert -- instructions; --, therefor.

Signed and Sealed this
Twelfth Day of February, 2013

Teresa Stanek Rea
*Acting Director of the United States Patent and Trademark Office*